US011094200B2

(12) United States Patent
Natarajan et al.

(10) Patent No.: US 11,094,200 B2
(45) Date of Patent: Aug. 17, 2021

(54) DYNAMIC PROCESSING SYSTEM FOR ROADSIDE SERVICE CONTROL AND OUTPUT GENERATION

(71) Applicant: Allstate Insurance Company, Northbrook, IL (US)

(72) Inventors: Kamal Natarajan, Northbrook, IL (US); Basil Hirzalla, Chicago, IL (US); Paul Turnbull, Chicago, IL (US); Kyle Walters, Chicago, IL (US); Mindy Domingo, Chicago, IL (US); Zachary Quinn, Chicago, IL (US); Korey Boone, Chicago, IL (US); Wilton Hunt, Chicago, IL (US); Sarah Bedoe, Cary, IL (US); Nicolas Couturier, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 16/668,683

(22) Filed: Oct. 30, 2019

(65) Prior Publication Data
US 2021/0118305 A1    Apr. 22, 2021

Related U.S. Application Data

(60) Provisional application No. 62/754,634, filed on Nov. 2, 2018.

(51) Int. Cl.
*G08G 1/13* (2006.01)
*G08G 1/00* (2006.01)
(Continued)

(52) U.S. Cl.
CPC ............. *G08G 1/202* (2013.01); *G06Q 10/20* (2013.01); *G07C 5/008* (2013.01); *G08G 1/137* (2013.01)

(58) Field of Classification Search
None
See application file for complete search history.

(56) References Cited

U.S. PATENT DOCUMENTS 6,339,736 B1    1/2002 Moskowitz et al.
6,812,888 B2 *  11/2004 Drury ................ G01C 21/3415
                                                    342/357.31
(Continued)

FOREIGN PATENT DOCUMENTS

CA          2909258 A1    4/2017

OTHER PUBLICATIONS

"RoadTrust" https://roadtrust.ca/ website visited Oct. 29, 2019, pp. 1-23.
(Continued)

*Primary Examiner* — K. Wong
(74) *Attorney, Agent, or Firm* — Banner & Witcoff, Ltd.

(57) ABSTRACT

Aspects of the disclosure relate to a dynamic processing system for roadside service control and output generation. A computing platform may receive map interface information. The computing platform may generate and display a map interface that includes a visual identifier that is centrally located on the map interface and corresponds to a location of the computing platform. The computing platform may receive a location adjustment input adjusting the map interface. The visual identifier may remain centrally located on the map interface while the location adjustment input is received and may correspond to a vehicle location after the location adjustment input is received. After receiving the location adjustment input and based at least in part on a received location confirmation input, the computing platform may send a disabled vehicle indication, which may include the vehicle location and cause dispatch of a service vehicle to the vehicle location.

21 Claims, 16 Drawing Sheets

(51) Int. Cl.
    *G08G 1/137*     (2006.01)
    *G07C 5/00*     (2006.01)
    *G06Q 10/00*     (2012.01)

(56) References Cited

U.S. PATENT DOCUMENTS

| | | | |
|---|---|---|---|
| 6,985,076 | B1 | 1/2006 | Bennie et al. |
| 7,412,313 | B2 | 8/2008 | Isaac |
| 8,750,898 | B2 | 6/2014 | Haney |
| 9,021,384 | B1 | 4/2015 | Beard et al. |
| 9,053,588 | B1 | 6/2015 | Briggs et al. |
| 9,384,491 | B1 * | 7/2016 | Briggs .................. H04M 3/487 |
| 9,389,096 | B2 | 7/2016 | Holden et al. |
| 9,584,967 | B1 | 2/2017 | Briggs et al. |
| 9,733,096 | B2 | 8/2017 | Colijn et al. |
| 2012/0105197 | A1 | 5/2012 | Kobres |
| 2015/0355822 | A1 | 12/2015 | Cochran et al. |
| 2017/0228709 | A1 | 8/2017 | Dhaliwal |
| 2017/0337522 | A1 | 11/2017 | Bennett |
| 2018/0191894 | A1 | 7/2018 | Shaw |
| 2018/0202821 | A1 | 7/2018 | Yu et al. |
| 2018/0374363 | A1 | 12/2018 | Ortiz |

OTHER PUBLICATIONS

"Saferoads" https://play.google.com/store/apps/details?id=com.saferoadshelpline.app&hl=en website visited Oct. 29, 2019, pp. 1-11.

"Towbook" https://play.google.com/store/apps/details?id=com.towbook.mobile website visited Oct. 29, 2019, pp. 1-3.

"Mopar Roadside Assistance" https://play.google.com/store/apps/details?id=com.aztechth.india.jeep website visited Oct. 29, 2019, pp. 1-2.

"RSA Auto i Care—Complete Car Care Solution" https://play.google.com/store/apps/details?id=com.appswale.rsauser website visited Oct. 29, 2019, pp. 1-7.

"KSK TH—Roadside Assistance" https://play.google.com/store/apps/details?id=com.axaassistance.kskinsurance website visited Oct. 29, 2019, pp. 1-11.

"ServiceNow Field Service Management" ServiceNow, Inc. https://www.servicenow.com/content/dam/servicenow-assets/public/en-us/doc-type/resource-center/data-sheet/ds-field-service-management.pdf website visited Oct. 29, 2019, pp. 1-2.

"Work from home: Roadside assistance and dispatch" Liveops https://join.liveops.com/call-types/work-from-home-roadside-assistance/ website visited Oct. 29, 2019, pp. 1-4.

"Hyundai Roadside Assistance" https://play.google.com/store/apps/details?id=com.clubautomobileapp.hyundai website visited Oct. 29, 2019, pp. 1-6.

"StrandD Roadside Assistance" https://play.google.com/store/apps/details?id=template.avacara.org.stranddemo website visited Jan. 14, 2019, pp. 1-16.

"Morni" https://www.morniksa.com/?locale=en website visited Oct. 29, 2019, pp. 1-9.

"Allianz RSA Pros" https://play.google.com/store/apps/details?id=ly.urgent.allianz.provider website visited Oct. 29, 2019, pp. 1-3.

Jan. 24, 2020—(WO) International Search Report & Written Opinion—PCT/US19/59209.

* cited by examiner

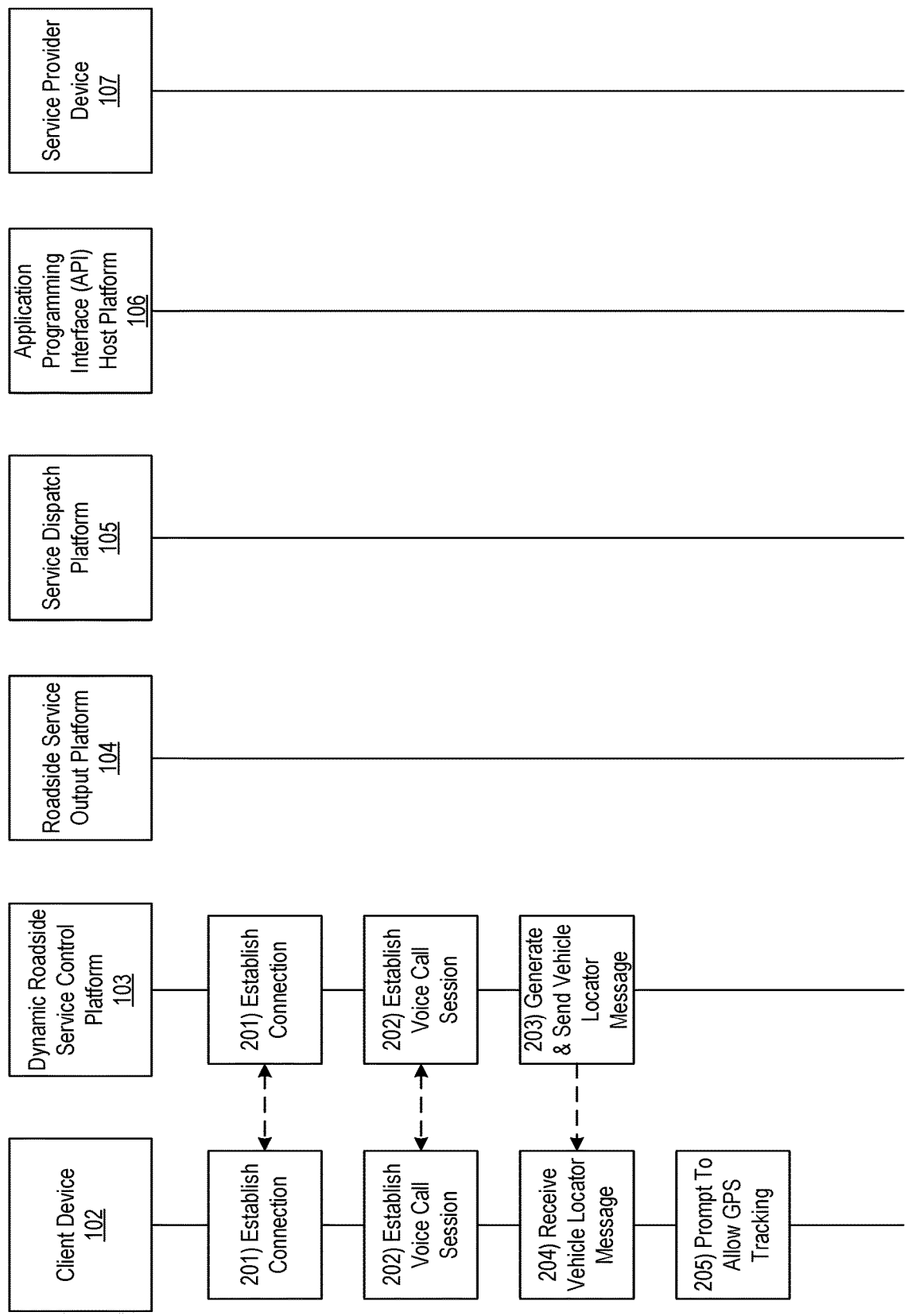

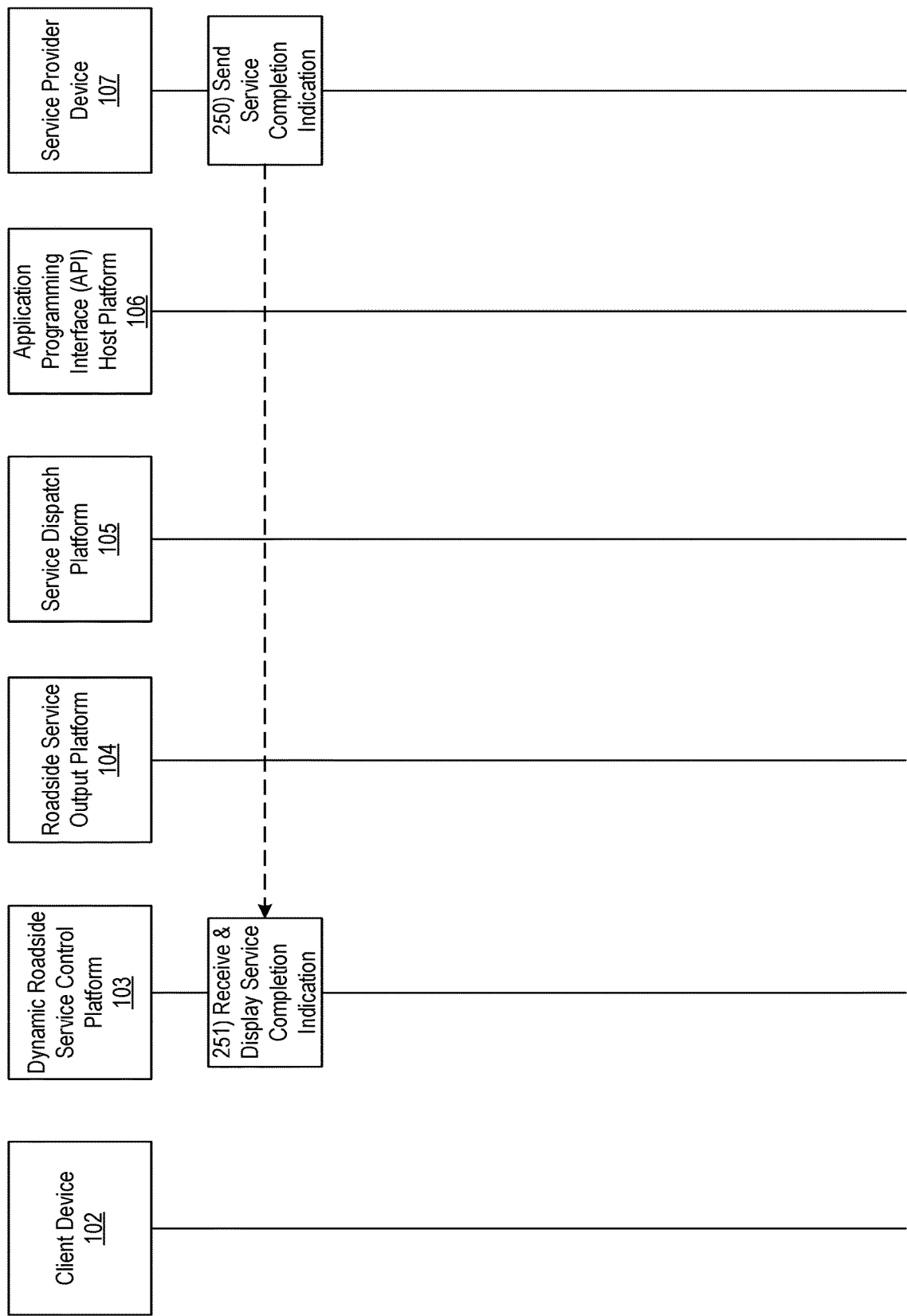

DYNAMIC PROCESSING SYSTEM FOR ROADSIDE SERVICE CONTROL AND OUTPUT GENERATION

CROSS-REFERENCE TO RELATED CASES

This application claims priority to U.S. Provisional Application 62/754,634, entitled DYNAMIC PROCESSING SYSTEM FOR ROADSIDE SERVICE CONTROL AND OUTPUT GENERATION, filed Nov. 2, 2018, the contents of which are incorporated herein by reference in its entirety for all purposes.

BACKGROUND

Aspects of the disclosure relate to enhanced processing systems for providing dynamic driving roadside service control and output generation. In particular, one or more aspects of the disclosure relate to dynamic roadside service control platforms that manage requests for service and determine appropriate service providers.

Many organizations and individuals rely on mobile devices to request a rescue or service for a disabled vehicle. In many instances, however, the individual might not be located at their vehicle, and thus GPS data corresponding to the mobile device might not reflect a location of the vehicle. There remains an ever-present need to develop improved solutions to provide roadside service.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems and methods for performing dynamic roadside service control.

In accordance with one or more embodiments of the disclosure, a computing platform comprising at least one processor and a memory storing computer readable instructions may receive map interface information. Using the map interface information, the computing platform may display a map interface, which may include a visual identifier that is centrally located on the map interface and corresponds to a location of the computing platform. In some instances, the visual identifier may be located in the exact center of the map interface. In other instances, the visual identifier might not be located in the exact center of the map interface, but may be located within a predetermined distance of the exact center of the map interface. In these instances, the predetermined distance may be less than a distance between the exact center of the map interface and an exterior edge of the map interface. Via a display of the computing platform, the computing platform may receive a location adjustment input corresponding to adjustment of the map interface. In one or more instances, the visual identifier may remain centrally located on the map interface while the location adjustment input is received and the visual identifier may correspond to a location of a vehicle after the location adjustment input is received. After receiving the location adjustment input, the computing platform may receive a location confirmation input. Based at least in part on the location confirmation input, the computing platform may send a disabled vehicle indication, which may include the location of the vehicle and may cause dispatch of a service vehicle to the location of the vehicle.

In one or more instances, the location of the vehicle may be different than the location of the computing platform. In one or more instances, the computing platform may receive a vehicle locator message and one or more commands directing the computing platform to display a global positioning system (GPS) tracking prompt. In these instances, the vehicle locator message may be generated by a dynamic roadside service control platform in response to a rescue request received from another computing platform.

In one or more instances, the computing platform may determine, using GPS data corresponding to the visual identifier after the location adjustment input is received, an address corresponding to the location of the vehicle. In one or more instances, the computing platform may receive an indication of a service provider to be dispatched to the location of the vehicle. In these instances, the computing platform may display the indication of the service provider. In one or more instances, in response to receiving user input indicating that the service provider is acceptable, the computing platform may send an indication indicating that the service provider is acceptable.

In one or more instances, the computing platform may receive an indication that a service provider has been dispatched to the location of the vehicle. The computing platform may display the indication that the service provider has been dispatched to the location of the vehicle.

In one or more instances, the computing platform may display the indication that the service provider has been dispatched to the location of the vehicle by displaying a map interface that indicates progress of the service provider from a dispatch location to the location of the vehicle.

These and additional aspects will be appreciated with the benefit of the disclosures discussed in further detail below.

BRIEF DESCRIPTION OF THE DRAWINGS

The present disclosure is illustrated by way of example and not limited in the accompanying figures in which like reference numerals indicate similar elements and in which:

FIGS. 2A-2J depict an illustrative event sequence for deploying a dynamic roadside service control platform that utilizes improved techniques for roadside service management and output generation in accordance with one or more example arrangements discussed herein;

FIG. 7 depicts an illustrative computing environment for deploying a roadside service module host platform that

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described herein, this disclosure is directed towards a system for providing roadside assistance. In one or more instances, the system may permit a user to designate, using a mapping application executing on a mobile device, a location of desired service. Accordingly, the roadside assistance system may detect the desired location and dispatch assistance based on the designated desired location, rather than merely global positioning system (GPS) data of the user's mobile device.

Figure 1A:
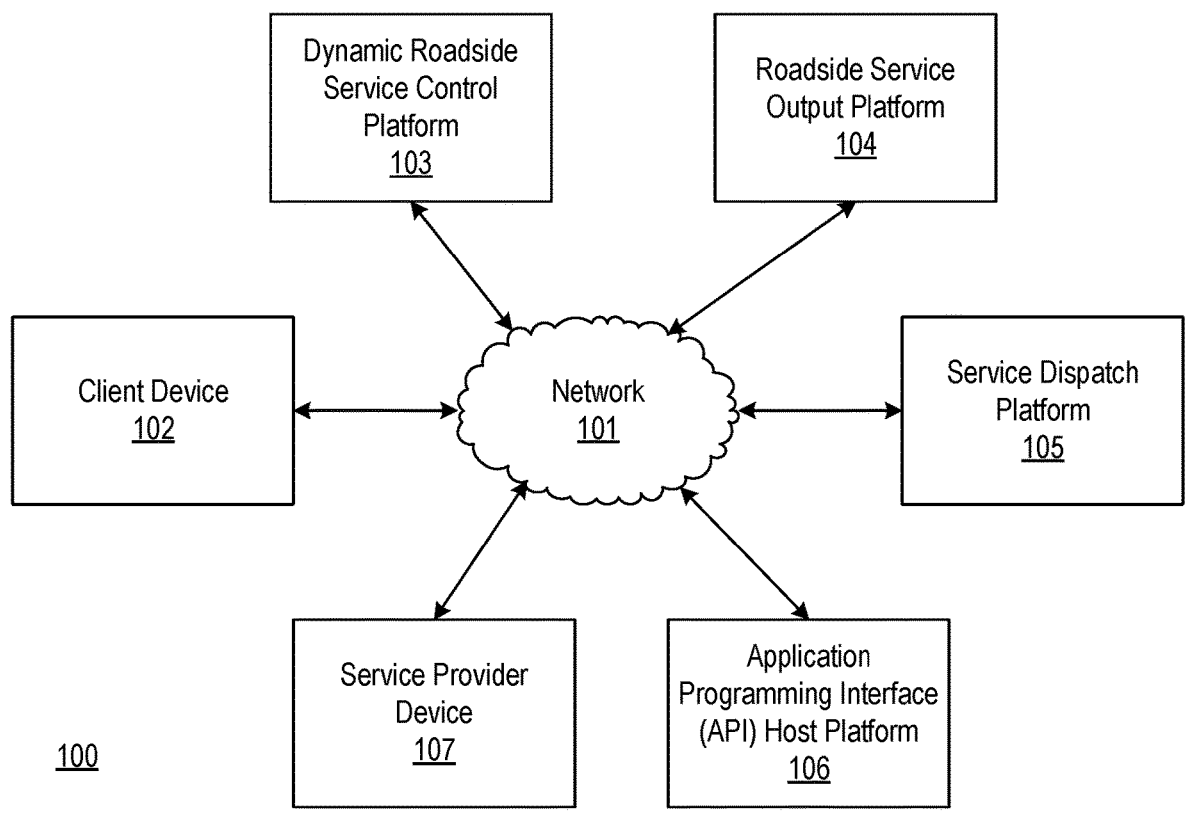
FIGS. 1A-1B depict an illustrative computing environment for deploying a dynamic roadside service control platform that utilizes improved techniques for roadside service management and output generation in accordance with one or more example arrangements discussed herein.
Figure 1B:
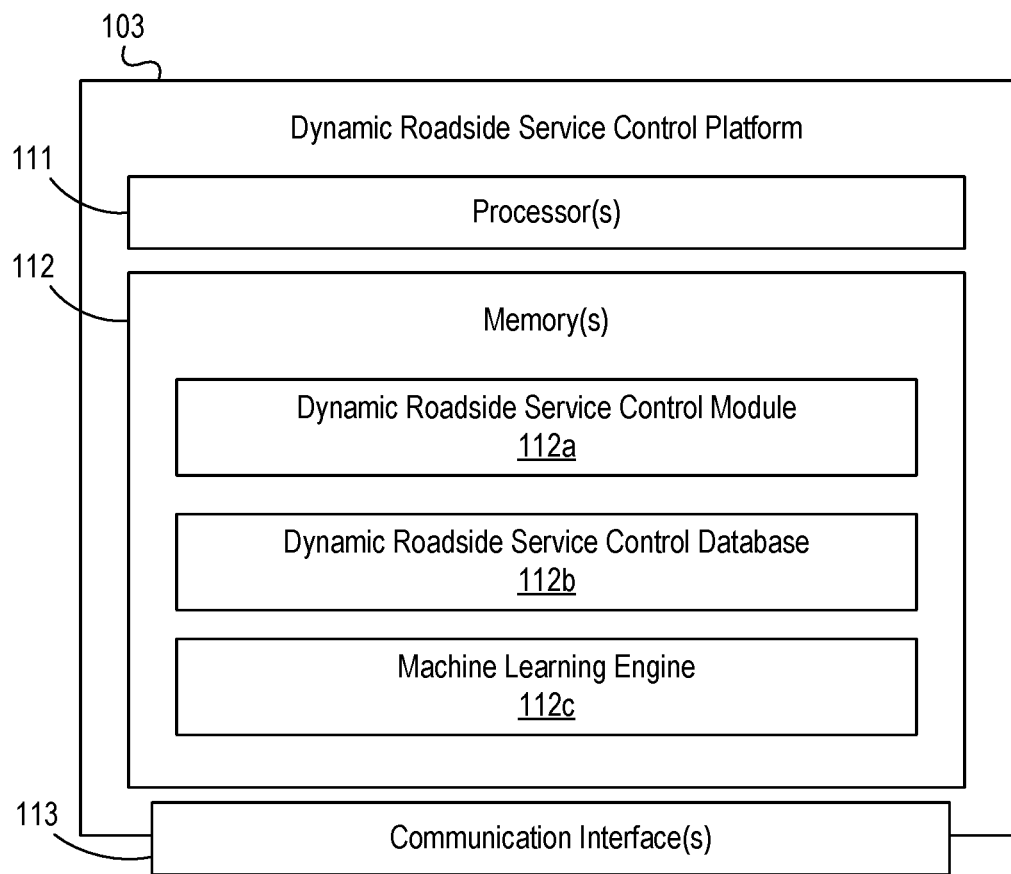

FIGS. 1A-1B depict an illustrative computing environment for deploying a dynamic roadside service control platform that utilizes improved techniques for roadside service management and output generation in accordance with one or more example embodiments. Referring to FIG. 1A, computing environment 100 may include one or more computer systems. For example, computing environment 100 may include a client device 102, a dynamic roadside service control platform 103, a roadside service output platform 104, a service dispatch platform 105, an application programming interface (API) host platform 106, and a service provider device 107.

Client device 102 may be a computing device (e.g., smart phone, tablet computer, laptop computer, or the like) that may be used to display map interfaces and receive user input corresponding to a location of a disabled vehicle. For example, the client device 102 may be used by a customer of an insurance company or vehicle dealership to identify a location of their disabled vehicle, and to send the location to the insurance company or vehicle dealership along with a request for rescue.

As illustrated in greater detail below, dynamic roadside service control platform 103 may include one or more computing devices configured to perform one or more of the functions described herein. For example, dynamic roadside service control platform 103 may include one or more computers (e.g., laptop computers, desktop computers, servers, server blades, or the like) configured to receive vehicle location inputs and to dispatch service members accordingly.

In addition, and as illustrated in greater detail below, the dynamic roadside service control platform 103 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by dynamic roadside service control platform 103 may be associated with an external portal provided by an organization, such as a service dispatch portal provided by an insurance institution or vehicle dealership.

Roadside service output platform 104 may include one or more computing devices configured to perform one or more of the functions described herein. For example, roadside service output platform 104 may include one or more computers (e.g., laptop computers, desktop computers, servers, server blades, or the like) configured to determine an appropriate service provider based on a rescue request received and to request a dispatch accordingly from the service provider.

Service dispatch platform 105 may include one or more computing devices configured to perform one or more of the functions described herein. For example, service dispatch platform 105 may include one or more computers (e.g., laptop computers, desktop computers, servers, server blades, or the like) configured to determine an appropriate employee of the service to attend to a rescue request and to send notifications to a device of the employee assigning the employee to the rescue request.

The API host platform 106 may be one or more computing devices configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by the API host platform 106 may correspond to local maps that may be adjusted to reflect a user's location.

Service provider device 107 may be a computing device (e.g., laptop computer, tablet computer, smart phone, or the like) that may be associated with an employee of a service provider, and may be used to receive service assignment indications and map interface information from a service dispatch platform, and to cause display of the assignment indications and generate map interfaces accordingly. In one or more instances, the service provider device 107 may also be used to capture images or video of a disabled vehicle.

Computing environment 100 also may include one or more networks, which may interconnect one or more of client device 102, dynamic roadside service control platform 103, roadside service output platform 104, service dispatch platform 105, API host platform 106, and service provider device 107. For example, computing environment 100 may include a network 101 (which may, e.g., interconnect client device 102, dynamic roadside service control platform 103, roadside service output platform 104, service dispatch platform 105, API host platform 106, and service provider device 107).

In one or more arrangements, client device 102, dynamic roadside service control platform 103, roadside service output platform 104, service dispatch platform 105, API host platform 106, service provider device 107, and/or the other systems included in computing environment 100 may be a type of computing device capable of receiving a user interface, receiving input using the user interface, and communicating the received input to one or more other computing devices, as well as being configured to perform the particular functions described herein. For example, client device 102, dynamic roadside service control platform 103, roadside service output platform 104, service dispatch platform 105, API host platform 106, service provider device 107, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of client device 102, dynamic roadside service control platform 103, roadside service output platform 104, service dispatch platform 105, API host platform 106, and service provider device 107 may, in some instances, be special-purpose computing devices configured to perform specific functions.

Referring to FIG. 1B, dynamic roadside service control platform 103 may include one or more processors 111, memory 112, and communication interface 113. A data bus may interconnect processor 111, memory 112, and communication interface 113. Communication interface 113 may be a network interface configured to support communication between dynamic roadside service control platform 103 and one or more networks (e.g., network 101, or the like). Memory 112 may include one or more program modules having instructions that when executed by processor 111 cause dynamic roadside service control platform 103 to perform one or more functions described herein and/or one or more databases that may store and/or otherwise maintain information which may be used by such program modules and/or processor 111. In some instances, the one or more program modules and/or databases may be stored by and/or maintained in different memory units of dynamic roadside service control platform 103 and/or by different computing devices that may form and/or otherwise make up dynamic roadside service control platform 103. For example, memory 112 may have, store, and/or include a dynamic roadside service control module 112a, a dynamic roadside service control database 112b, and a machine learning engine 112c. Dynamic roadside service control module 112a may have instructions that direct and/or cause dynamic roadside service control platform 103 to execute advanced roadside service control methods for processing rescue requests, as discussed in greater detail below. Dynamic roadside service control database 112b may store information used by dynamic roadside service control module 112a and/or dynamic roadside service control platform 103 in dynamic roadside service control and/or in performing other functions. Machine learning engine 112c may have instructions that direct and/or cause the dynamic roadside service control platform 103 to perform dynamic roadside service control and to set, define, and/or iteratively refine optimization rules and/or other parameters used by the dynamic roadside service control platform 103 and/or other systems in computing environment 100.

Figure 2B:
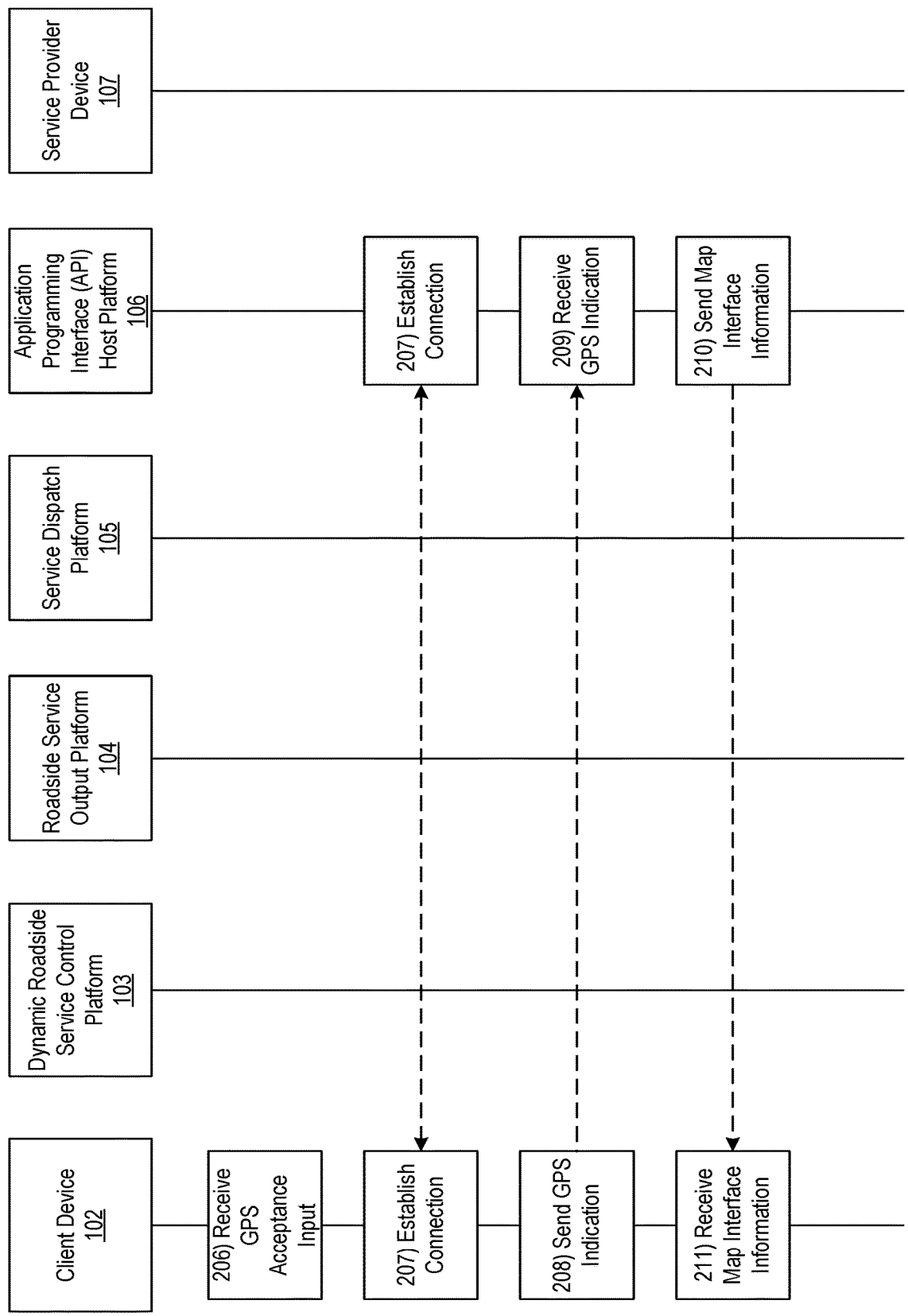

FIGS. 2A-2J depict an illustrative event sequence for deploying a dynamic roadside service control platform 103 that utilizes improved techniques to address roadside service requests in accordance with one or more example embodiments. Referring to FIG. 2A, at step 201, the client device 102 may establish a connection with the dynamic roadside service control platform 103. In one or more instances, the client device 102 may establish a first wireless data connection with the dynamic roadside service control platform 103 to link the client device 102 with the dynamic roadside service control platform 103.

At step 202, the client device 102 may establish a voice call session with the dynamic roadside service control platform 103. In one or more instances, the voice call session may be established via the first wireless data connection. In these instances, the client device 102 may establish the voice call session to allow a user of the client device 102, such as a customer of an insurance institution or vehicle dealership, to inform an entity controlling the dynamic roadside service control platform 103 (e.g., the insurance institution or vehicle dealership), that his or her vehicle is disabled and a rescue is requested. In some instances, rather than establishing the voice call session with the dynamic roadside service control platform 103, the client device may send a rescue request indication to the dynamic roadside service control platform 103 while the first wireless data connection is established.

At step 203, the dynamic roadside service control platform 103 may generate a vehicle locator message and may send the vehicle locator message to the client device 102. In one or more instances, the dynamic roadside service control platform 103 may send the vehicle locator message via the communication interface 112 while the first wireless data connection is established. In sending the vehicle locator message, the dynamic roadside service control platform 103 may send an indication that the rescue request has been received and one or more commands directing the client device 102 to display a GPS tracking prompt. Additionally or alternatively, in sending the vehicle locator message, the dynamic roadside service control platform 103 may send a link to a mapping interface.

In one or more instances, the dynamic roadside service control platform 103 may send the vehicle locator message to a different client device than the one that established the voice call session at step 202. For example, a parent may use their mobile device to contact the dynamic roadside service control platform 103 on behalf of a child who is located at a disabled vehicle. In this example, the parent may provide the dynamic roadside service control platform 103 with a phone number for the child's mobile device, and the dynamic roadside service control platform 103 may send the vehicle locator message to the child's mobile device.

At step 204, the client device 102 may receive the vehicle locator message and the one or more commands directing the client device 102 to display the GPS tracking prompt from the dynamic roadside service control platform 103. In one or more instances, the client device 102 may receive the vehicle locator message and the one or more commands directing the client device to display the GPS tracking prompt while the first wireless data connection is established.

At step 205, the client device 102 may display an interface prompting a user to enable GPS tracking. In one or more instances, the client device 102 may display an interface that allows a user to select whether or not GPS tracking will be allowed.

Referring to FIG. 2B, at step 206, the client device 102 may receive a GPS acceptance input indicating that access to the client device 102's GPS data is permitted. In one or more instances, the GPS acceptance input may be received as a voice command, a gesture input, a touch input, or the like.

At step 207, the client device 102 may establish a connection with the API host platform 106. In one or more instances, the client device 102 may establish a second wireless data connection with the API host platform 106 to link the client device 102 to the API host platform 106.

At step 208, the client device 102 may send an indication of the GPS acceptance input to the API host platform 106. In one or more instances, the client device 102 may send the indication of the GPS acceptance input to the API host platform 106 while the second wireless data connection is established.

At step 209, the API host platform 106 may receive the indication of the GPS acceptance input from the client device 102. In one or more instances, the API host platform 106 may receive the GPS acceptance input from the client device 102 while the second wireless data connection is established.

At step 210, based on the indication of the GPS acceptance input, the API host platform 106 may send map interface information. In one or more instances, the API host platform 106 may access GPS data corresponding to the client device 102, and may send information to the client device 102 that may allow the client device 102 to generate a map interface corresponding to a location of the client device.

At step 211, the client device 102 may receive the map interface information from the API host platform 106. In one or more instances, the client device 102 may receive the map interface information while the second wireless data connection is established.

Figure 2C:
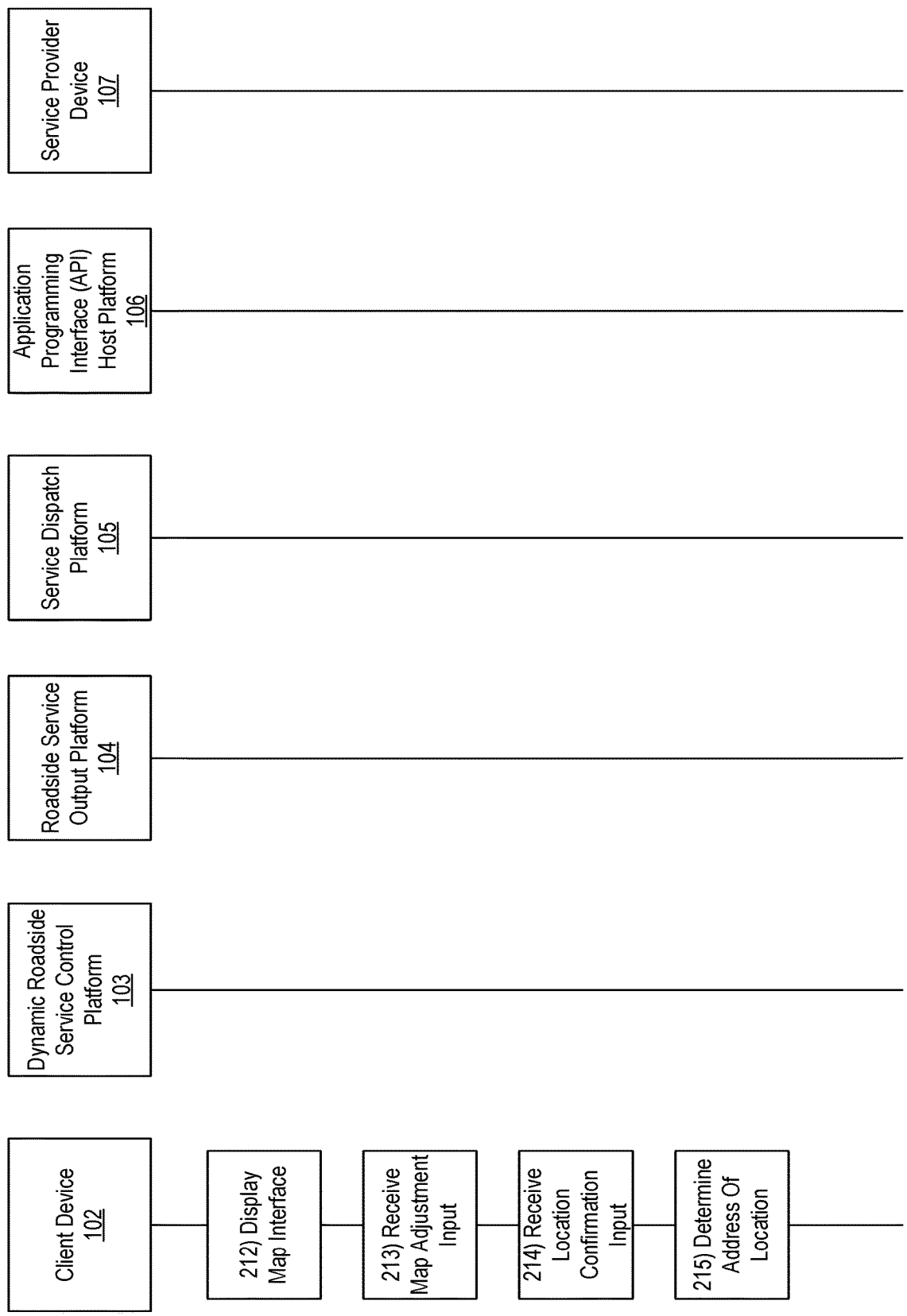

Referring to FIG. 2C, at step 212, the client device 102 may display the map interface using the map interface information received at step 211. In one or more instances, in displaying the map interface, the client device 102 may display a map with a pin indicating a location of the client device 102. In these instances, the map may be adjustable and the pin may have a fixed position on the display.

Figure 5:
FIGS. 5-6 depict illustrative user interfaces in accordance with deploying a dynamic roadside service control platform that utilizes improved techniques for roadside service management and output generation in accordance with one or more example arrangements discussed herein.
Figure 6:
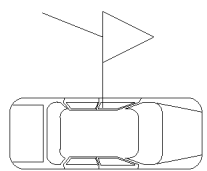

At step 213, the client device 102 may receive a map adjustment input. In one or more instances, the user of the client device 102 may have left the scene of his or her disabled vehicle or might not have been present at the vehicle (e.g., in the case of a parent and child). In these instances, the location of the client device 102 might not be the location of the disabled vehicle. Accordingly, the client device 102 may receive a user input to drag the map displayed on the client device 102 so that the pin is located at the disabled vehicle. In one or more instances, to receive the map adjustment input, the client device 102 may display a graphical user interface similar to graphical user interface 505, which is displayed in FIG. 5. In these instances, a pin 510 might not be located at the vehicle location (e.g., a user may have walked away from the vehicle and thus a GPS location of the client device 102 is different than the location of the disabled vehicle). In some instances, the vehicle might not be displayed on the map interface. In one or more instances, in receiving the map adjustment input, the client device 102 may adjust the graphical user interface 505 to resemble the graphical user interface 605, which is shown in FIG. 6. In these instances, a pin 610 may be located at the vehicle location. In some instances, the client device 102 might not be located at the vehicle location. In some instances, the pin 510 or 610 may be located at the exact center of the graphical user interface. In other instances, the pin 510 or 610 might not be located at the exact center of the graphical user interface. Rather, the pin 510 or 610 may be located a predetermined distance from the exact center of the graphical user interface. In these instances, the predetermined distance may be less than a distance between the exact center of the graphical user interface and an outer boundary of the graphical user interface.

At step 214, the client device 102 may receive a location confirmation input. In one or more instances, in receiving the location confirmation input, the client device 102 may receive a user input indicating that the map interface has been adjusted to indicate the location of the disabled vehicle. In one or more instances, in receiving the location confirmation input, the client device 102 may receive a gesture input, a touch input, a voice input, or the like.

At step 215, the client device may determine an address corresponding to the location confirmed at step 214. In one or more instances, the client device may determine the address based on GPS data corresponding to the map interface.

Figure 2D:
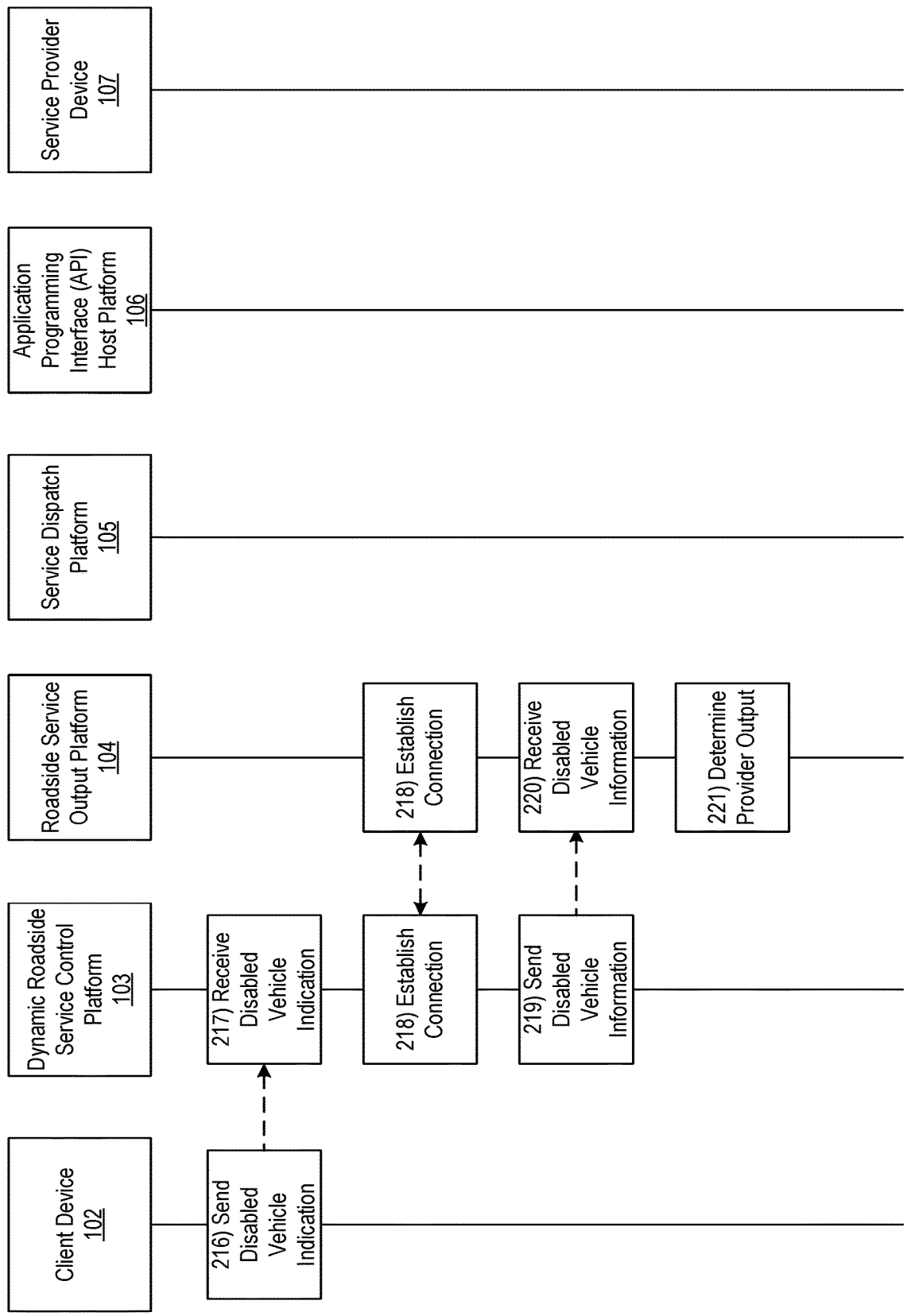

Referring to FIG. 2D, at step 216, the client device 102 may send an indication of the disabled vehicle to the dynamic roadside service control platform 103. In one or more instances, in sending the indication of the disabled vehicle, the client device 102 may send the address of the disabled vehicle along with a request for rescue. In one or more instances, in sending the indication of the disabled vehicle, the client device 102 may send details corresponding to the disabled vehicle (e.g., vehicle type, issue with the vehicle, or the like). In one or more instances, the client device 102 may send the disabled vehicle indication to the dynamic roadside service control platform 103 while the first wireless data connection is established.

At step 217, the dynamic roadside service control platform 103 may receive the disabled vehicle information sent at step 216. In one or more instances, the dynamic service control platform 103 may receive the disabled vehicle information via the communication interface 113 while the first wireless data connection is established.

At step 218, the dynamic roadside service control platform 103 may establish a connection with the roadside service output platform 104. In one or more instances, the dynamic roadside service control platform 103 may establish a third wireless data connection with the roadside service output platform 104 to link the dynamic roadside service control platform 103 with the roadside service output platform.

At step 219, the dynamic roadside service control platform 103 may send information corresponding to the disabled vehicle to the roadside service output platform 104. In one or more instances, in sending the information corresponding to the disabled vehicle, the dynamic roadside service control platform 103 may send information of the vehicle type, the vehicle problem, the location of the disabled vehicle, or the like. In one or more instances, the disabled vehicle information may correspond to the disabled vehicle indication received at step 217. In one or more instances, the dynamic roadside service control platform 103 may send the disabled vehicle information to the roadside service output platform 104 via the communication interface 113 while the third wireless data connection is established.

At step 220, the roadside service output platform 104 may receive the disabled vehicle information sent at step 219. In one or more instances, the roadside service output platform 104 may receive the disabled vehicle information while the third wireless data connection is established.

At step 221, the roadside service output platform 104 may determine a provider output. In determining the provider output, the roadside service output platform 104 may determine a service provider to address the rescue request. In one or more instances, the roadside service output platform 104 may determine the service provider based on the location of the disabled vehicle, the issue with the vehicle, or the like.

Figure 2E:
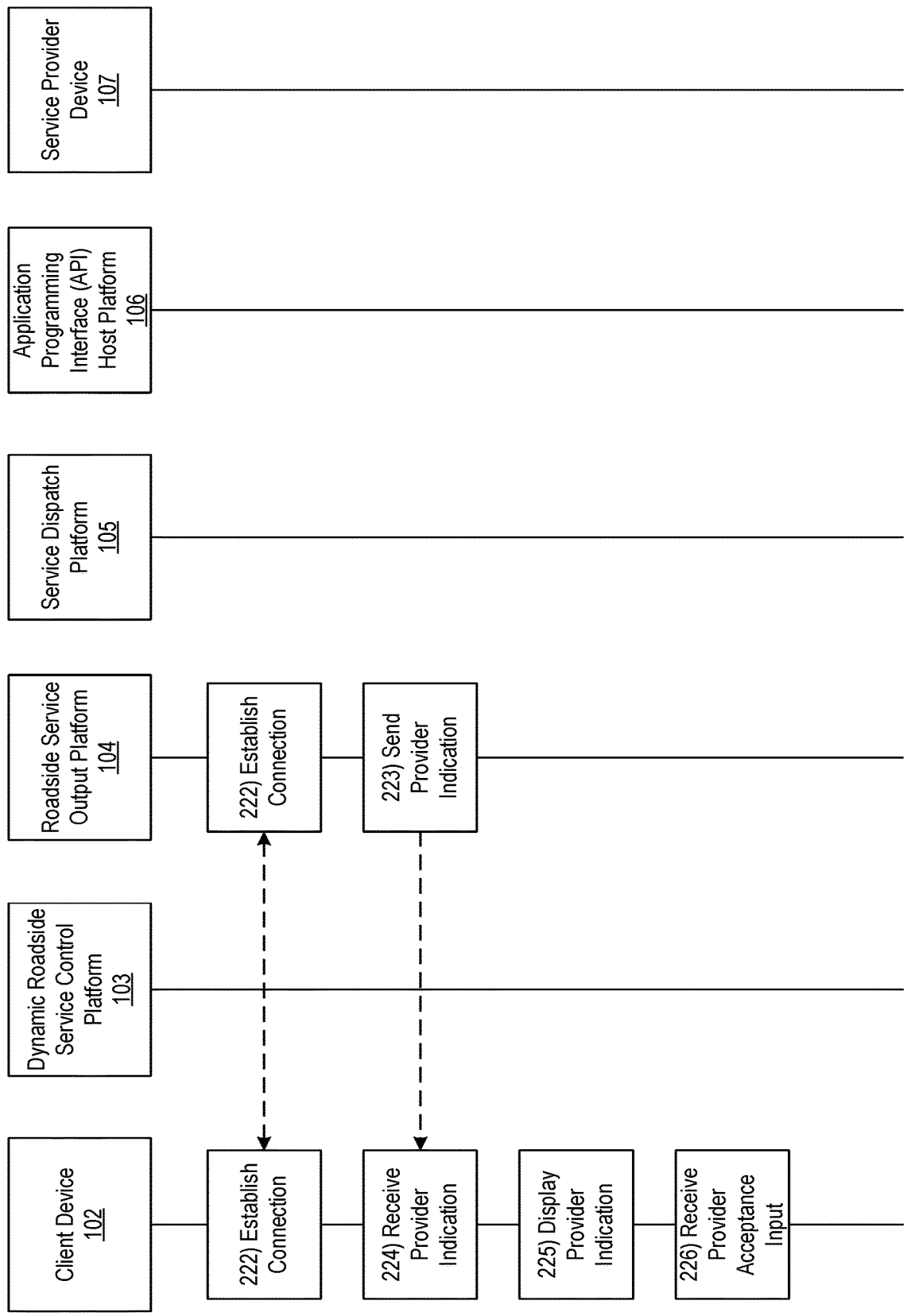

Referring to FIG. 2E, at step 222, the roadside service output platform 104 may establish a connection with client device 102. In one or more instances, the roadside service output platform 104 may establish a fourth wireless data connection with the client device 102 to link the roadside service output platform 104 to the client device 102.

At step 223, the roadside service output platform 104 may send a provider indication to the client device 102 indicating the provider output determined at step 221. In one or more instances, the roadside service output platform 104 may also send one or more commands directing the client device 102 to display the provider indication. In one or more instances, the roadside service output platform 104 may send the provider indication to the client device 102 while the fourth wireless data connection is established.

At step 224, the client device 102 may receive the provider indication from the roadside service output platform 104. In one or more instances, the client device 102 may receive the provider indication while the fourth wireless data connection is established.

At step 225, the client device 102 may display the provider indication. In displaying the provider indication, the client device 102 may display a name of the service provider corresponding to the provider output. In one or more instances, the client device 102 may also display metrics and/or description corresponding to the service provider (e.g., reviews, rating, cost, or the like). In addition, the client device 102 may prompt the user to accept or reject the service provider via a touch input, gesture input, voice input, or the like.

At step 226, the client device 102 may receive a provider acceptance input indicating that the user accepts the service provider selected by the roadside service output platform 104. In one or more instances, the client device 102 might not receive a provider acceptance input and may return to step 221 to have another provider output determined.

Figure 2F:
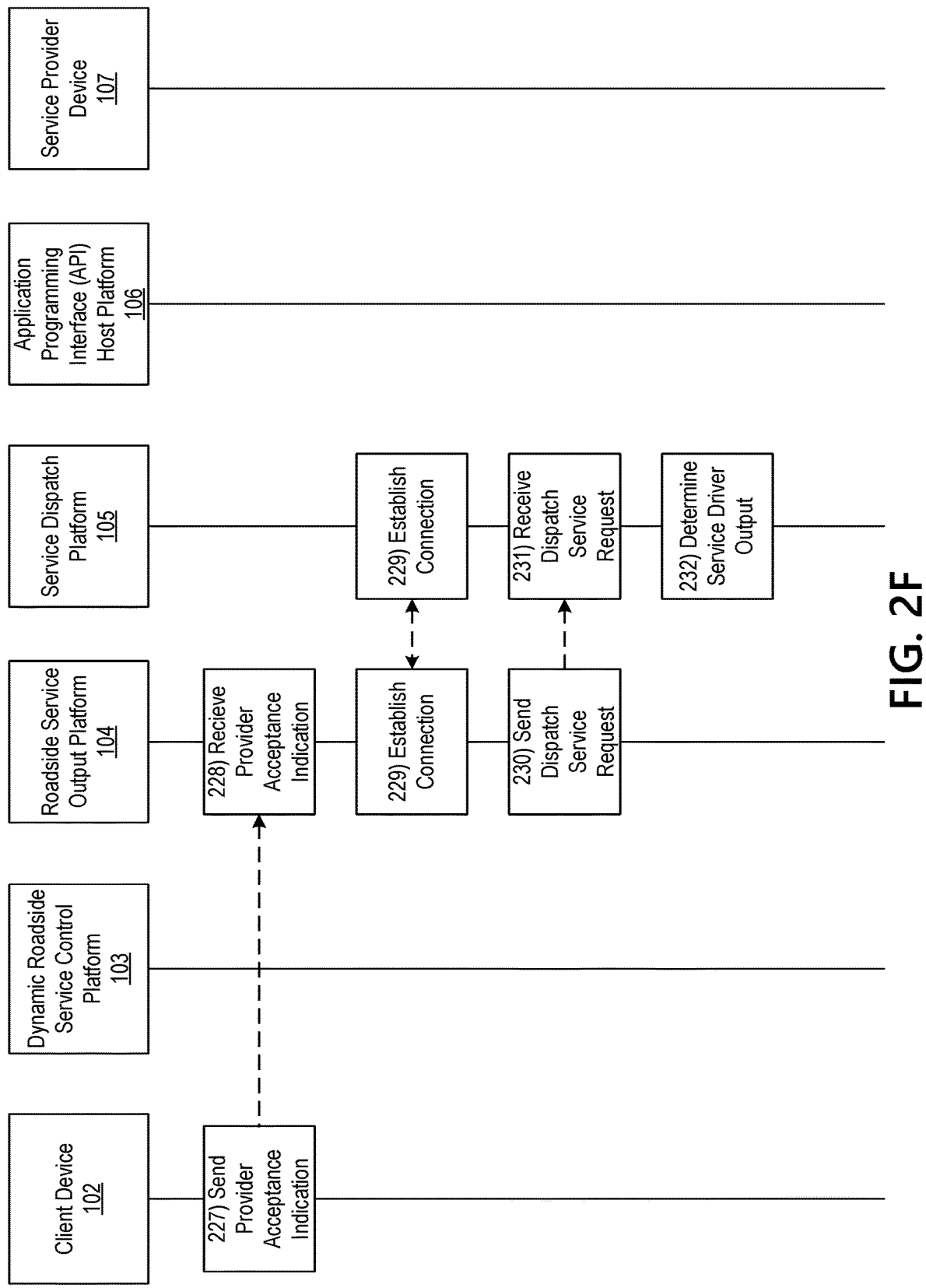

Referring to FIG. 2F, at step 227, the client device 102 may send a provider acceptance indication to the roadside service output platform 104. In one or more instances, the client device 102 may send the provider acceptance indication while the fourth wireless data connection is established.

At step 228, the roadside service output platform 104 may receive the provider acceptance indication sent at step 227. In one or more instances, the roadside service output platform 104 may receive the provider acceptance indication while the fourth wireless data connection is established.

At step 229, the roadside service output platform 104 may establish a connection with a service dispatch platform 105. In one or more instances, the roadside service output platform 104 may establish a fifth wireless data connection to link the roadside service output platform 104 to the service dispatch platform 105. In one or more instances, the roadside service output platform 104 may identify a service dispatch platform corresponding to the service provider accepted at step 228 and may establish the connection with that service dispatch platform.

At step 230, the roadside service output platform 104 may send one or more commands directing the service dispatch platform 105 to determine a service driver. In one or more instances, the roadside service output platform 104 may send the location of the disabled vehicle to the service dispatch platform 105 along with the commands. In some instances, the roadside service output platform 104 may send the one or more commands directing the service dispatch platform 105 to determine the service driver while the fifth wireless data connection is established.

At step 231, the service dispatch platform 105 may receive a service dispatch request. For example, the service dispatch platform 105 may receive the one or more commands directing the service dispatch platform 105 to determine the service driver. In one or more instances, the service dispatch platform 105 may receive the one or more commands directing the service dispatch platform 105 to determine the service driver while the fifth wireless data connection is established.

At step 232, the service dispatch platform 105 may determine a service driver output corresponding to a service driver to be assigned to the disabled vehicle. In one or more instances, the service dispatch platform 105 may determine the service driver output based on a location of each service driver in relation to the location of the disabled vehicle. Additionally or alternatively, the service dispatch platform 105 may determine the service driver output based on availability of each of the service drivers. In one or more instances, the service dispatch platform 105 may have a predetermined time period within which to determine the service driver output. In these instances, if a service driver output is not determined, the event sequence may return to step 221 to determine a new provider output. Additionally or alternatively, the service dispatch platform 105 may be configured to accept or reject the service dispatch request automatically or based on a user input. If the service dispatch platform 105 rejects the service dispatch request, the event sequence may return to step 221 to determine a new provider output.

Figure 2G:
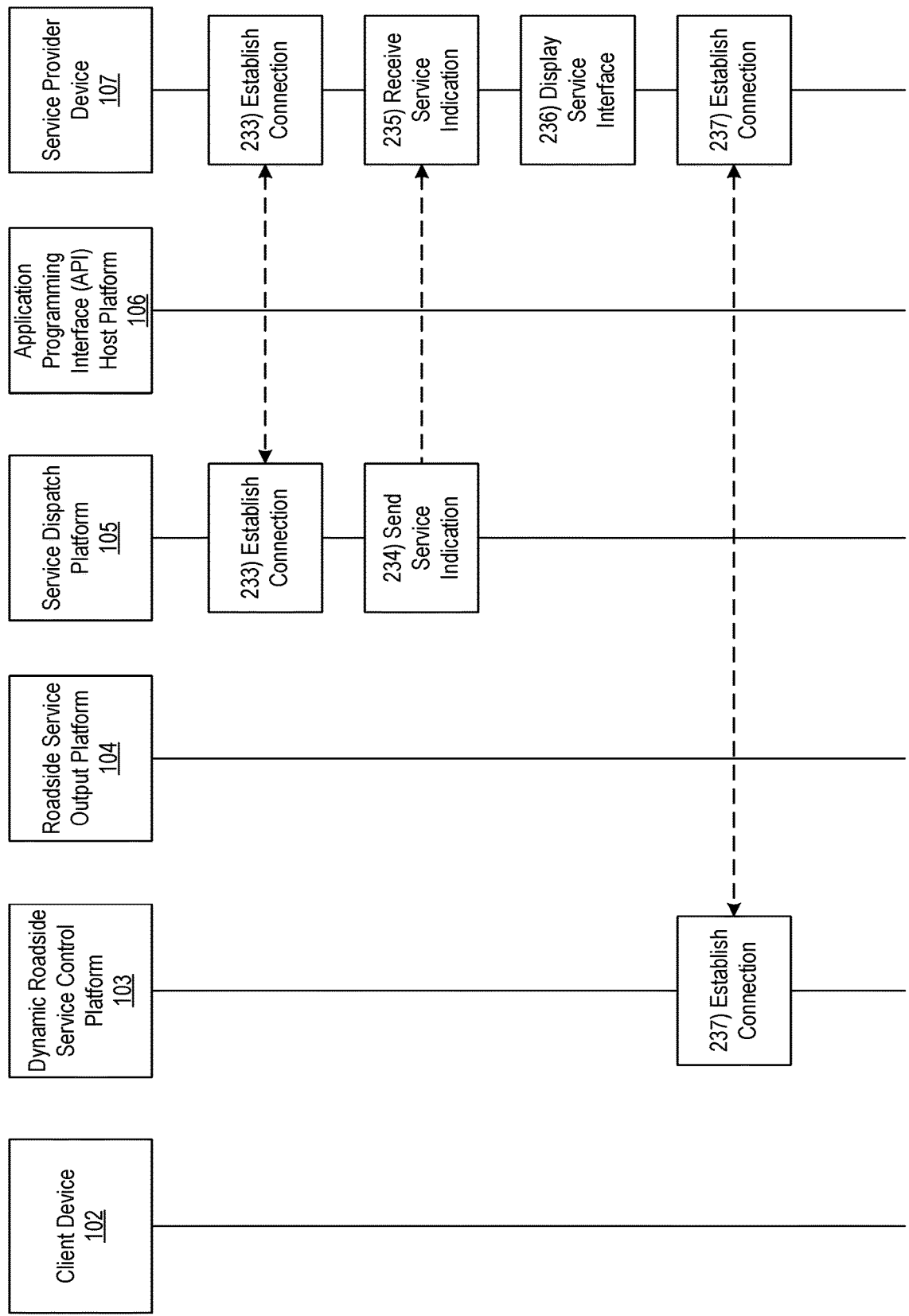

Referring to FIG. 2G, at step 233 the service dispatch platform 105 may establish a connection with the service provider device 107. In one or more instances, the service dispatch platform 105 may establish a sixth wireless data connection to link the service dispatch platform 105 to the service provider device 107. In one or more instances, the service provider device 107 may be associated with a service driver corresponding to the service driver output determined at step 232.

At step 234, the service dispatch platform 105 may send a service indication to the service provider device 107. In sending the service indication, the service dispatch platform 105 may send an indication to the service provider device 107 assigning the service driver corresponding to the service provider device to the rescue request. In one or more instances, the service dispatch platform 105 may send one or more commands directing the service provider device 107 to display a service interface based on the service indication. In one or more instances, the service dispatch platform 105 may send the service indication to the service provider device 107 while the sixth wireless data connection is established.

At step 235, the service provider device 107 may receive the service indication sent at step 234. In one or more instances, the service provider device 107 may receive the service indication while the sixth wireless data connection is established.

At step 236, the service provider device 107 may display a service interface based on the service indication received at step 235. In one or more instances, in displaying the service interface, the service provider device 107 may display the address/location of the disabled vehicle. In some instances, the service provider device 107 may display directions to the location of the disabled vehicle. Additionally, and in some instances, the service provider device 107 may display an indication of the problem with the vehicle (e.g., needs a tow, gas delivery, flat tire, or the like).

At step 237, the service provider device 107 may establish a connection with the dynamic roadside service control platform 103. In one or more instances, the service provider device 107 may establish a seventh wireless data connection with the dynamic roadside service control platform 103 to link the service provider device 107 to the dynamic roadside service control platform 103.

Figure 2H:
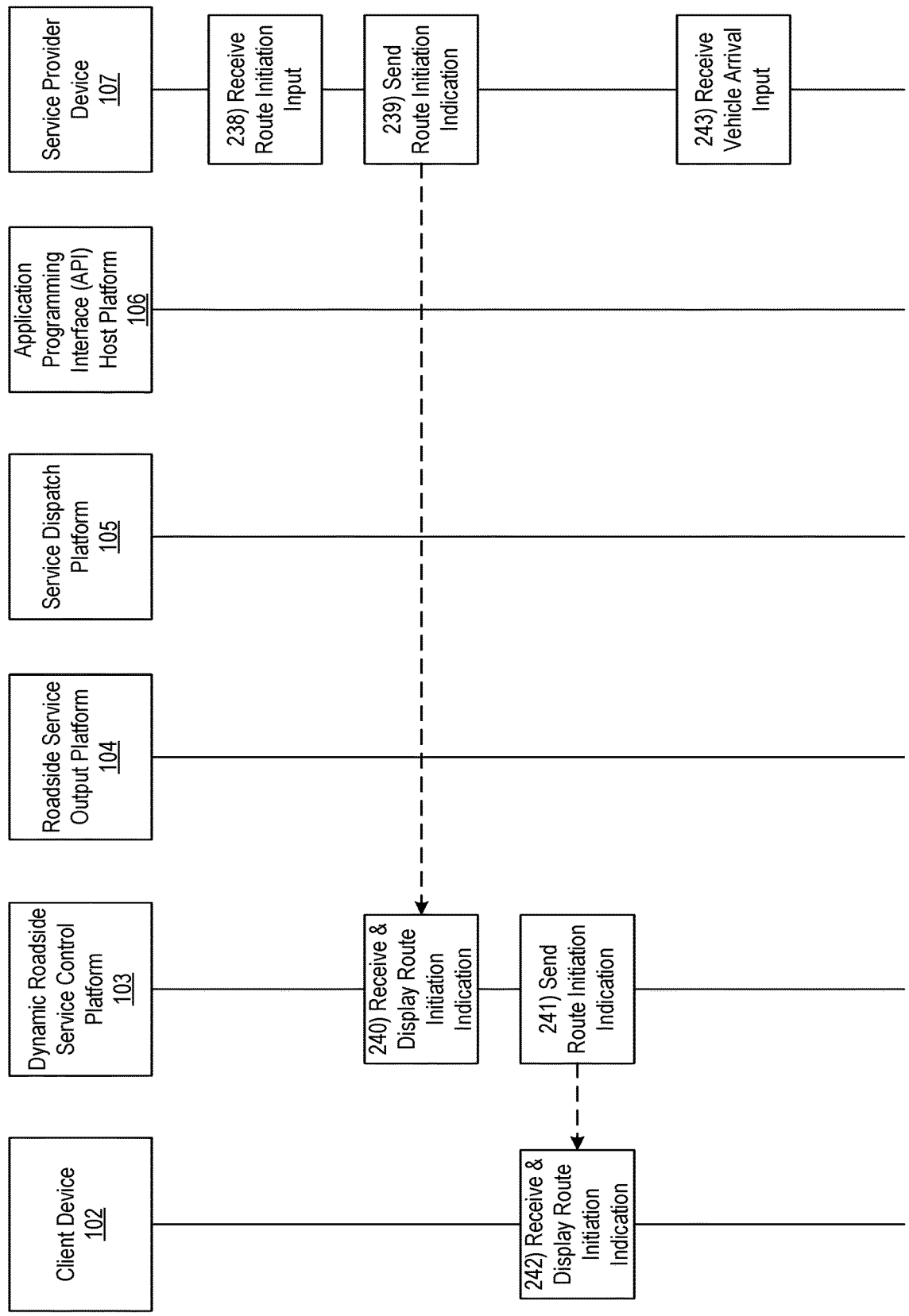

Referring to FIG. 2H, at step 238, the service provider device 107 may receive a route initiation input via a display of the service provider device 107. In receiving the route initiation input, the service provider device 107 may receive an indication that the service driver is initiating a route to the disabled vehicle.

At step 239, the service provider device 107 may send a route initiation indication to the dynamic roadside service control platform 103. In one or more instances, the service provider device 107 may send the route initiation indication to the dynamic roadside service control platform while the seventh wireless data connection is established.

At step 240, the dynamic roadside service control platform 103 may receive the route initiation indication. In one or more instances, the dynamic roadside service control platform 103 may receive the route initiation indication via the communication interface 113 and while the seventh wireless data connection is established.

At step 241, the dynamic roadside service control platform 103 may forward the route initiation indication to the client device 102. In one or more instances, the dynamic roadside service control platform 103 may forward the route initiation indication to the client device 102 via the communication interface 113 and while the first wireless data connection is established.

At step 242, the client device 102 may receive the route initiation indication sent at step 241. In one or more instances, the client device 102 may receive the route initiation indication while the first wireless data connection is established. In one or more instances, the client device 102 may display the route initiation indication. In displaying the route initiation indication, the client device 102 may display a notification that the service driver is en route to the disabled vehicle. In some instances, the client device 102 may show a map that tracks progress of the service driver. In some instances, the client device 102 may display an estimated time of arrival of the service driver.

At step 243, the service provider device 107 may receive a vehicle arrival input indicating that the service driver has arrived at the disabled vehicle. In one or more instances, the service provider device 107 may receive the vehicle arrival input via a display of the service provider device 107, as a touch input, as a voice input, or other similar input methods.

Figure 2I:
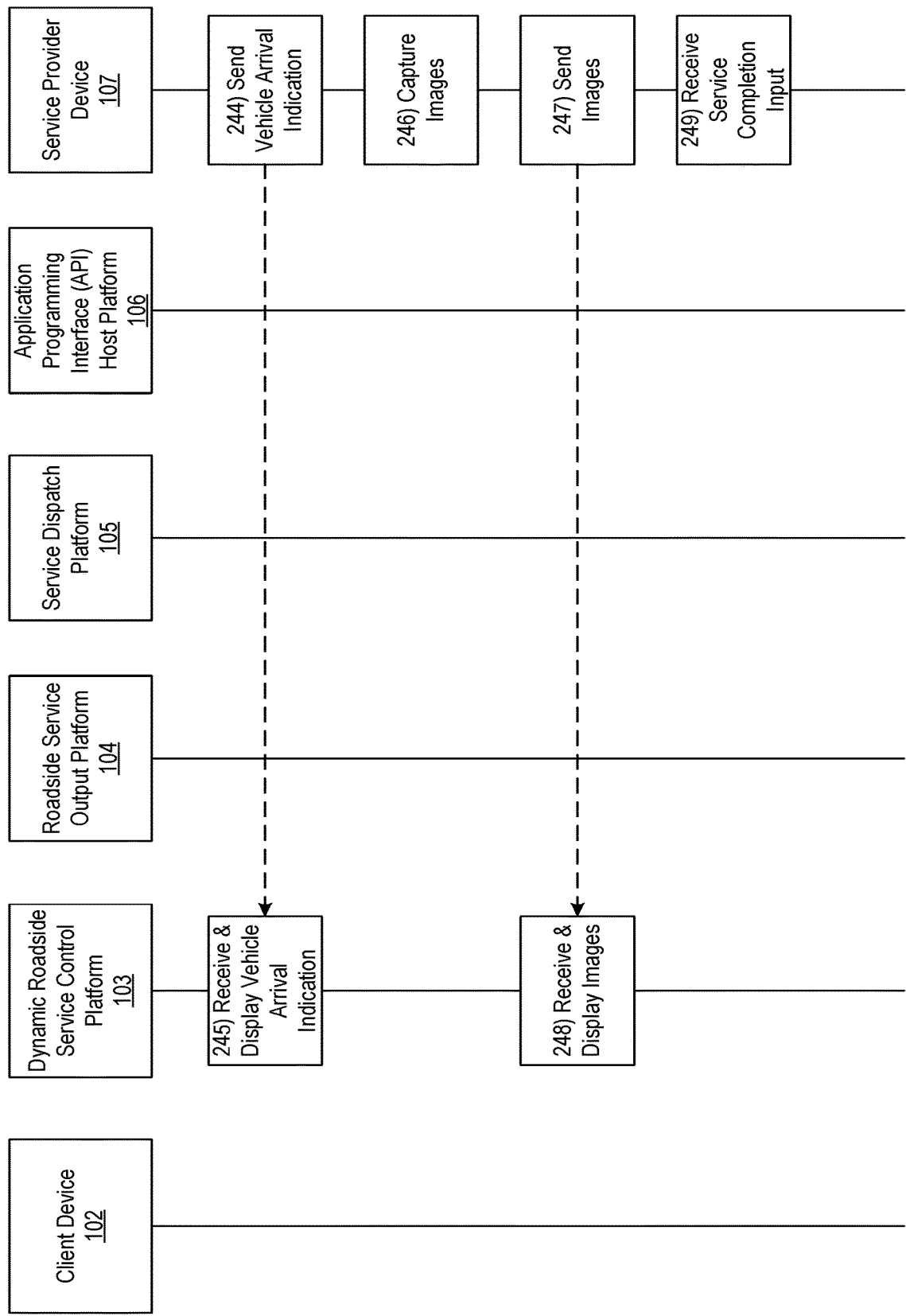

Referring to FIG. 2I, at step 244, the service provider device 107 may send a vehicle arrival indication based on the vehicle arrival input. In one or more instances, the service provider device 107 may send the vehicle arrival indication to the dynamic roadside service control platform 103 while the seventh wireless data connection is established.

At step 245, the dynamic roadside service control platform 103 may receive the vehicle arrival indication sent at step 244. In one or more instances, the dynamic roadside service control platform 103 may receive the vehicle arrival indication via the communication interface 113 and while the seventh wireless data connection is established. In some instances, the dynamic roadside service control platform 103 may display the vehicle arrival indication. In displaying the vehicle arrival indication, the dynamic roadside service control platform 103 may inform an employee of an insurance institution or vehicle dealership managing the rescue request that the service driver has arrived at the disabled vehicle.

At step 246, the service provider device 107 may capture images of the disabled vehicle. Additionally or alternatively, the service provider device 107 may capture video footage of the disabled vehicle.

At step 247, the service provider device 107 may send the images to the dynamic roadside service control platform 103. In one or more instances, the service provider device 107 may send the images to the dynamic roadside service control platform 103 while the seventh wireless data connection is established.

At step 248, the dynamic roadside service control platform 103 may receive the images and may display the images. This may allow an employee of the insurance institution or the vehicle dealership to assess damage to the disabled vehicle via the dynamic roadside service control platform 103. In one or more instances, the dynamic roadside service control platform may receive the images via the communication interface 113 and while the seventh wireless data connection is established.

At step 249, the service provider device 107 may receive a service completion input indicating that service to the disabled vehicle is completed (e.g., vehicle has been repaired, successfully towed, or the like). In receiving the service completion input, the service provider device 107 may receive a gesture input, a voice input, a touch input, or the like.

With reference to FIG. 2J, at step 250, the service provider device 107 may send a service completion indication, based on the service completion input, to the dynamic roadside service control platform 103. In one or more instances, the service provider device 107 may send the service completion indication while the seventh wireless data connection is established.

At step 251, the dynamic roadside service control platform 103 may receive the service completion indication from the service provider device 107 and may display the service completion indication accordingly. In one or more instances, the dynamic roadside service control platform 103 may receive the service completion indication via the communication interface 113 while the seventh wireless data connection is established.

Although steps 201-251 describe a single event sequence related to a single client device, it should be understood that multiple rescue requests may be processed by the dynamic roadside service control platform 103 simultaneously. In one or more instances, the dynamic roadside service control platform 103 may show a large map that tracks multiple requests. In these instances, if service is delayed for a particular request, the request may be escalated to a list of high priority requests. Additionally, the map may show where various service drivers are in relation to the disabled vehicles.

Figure 3:
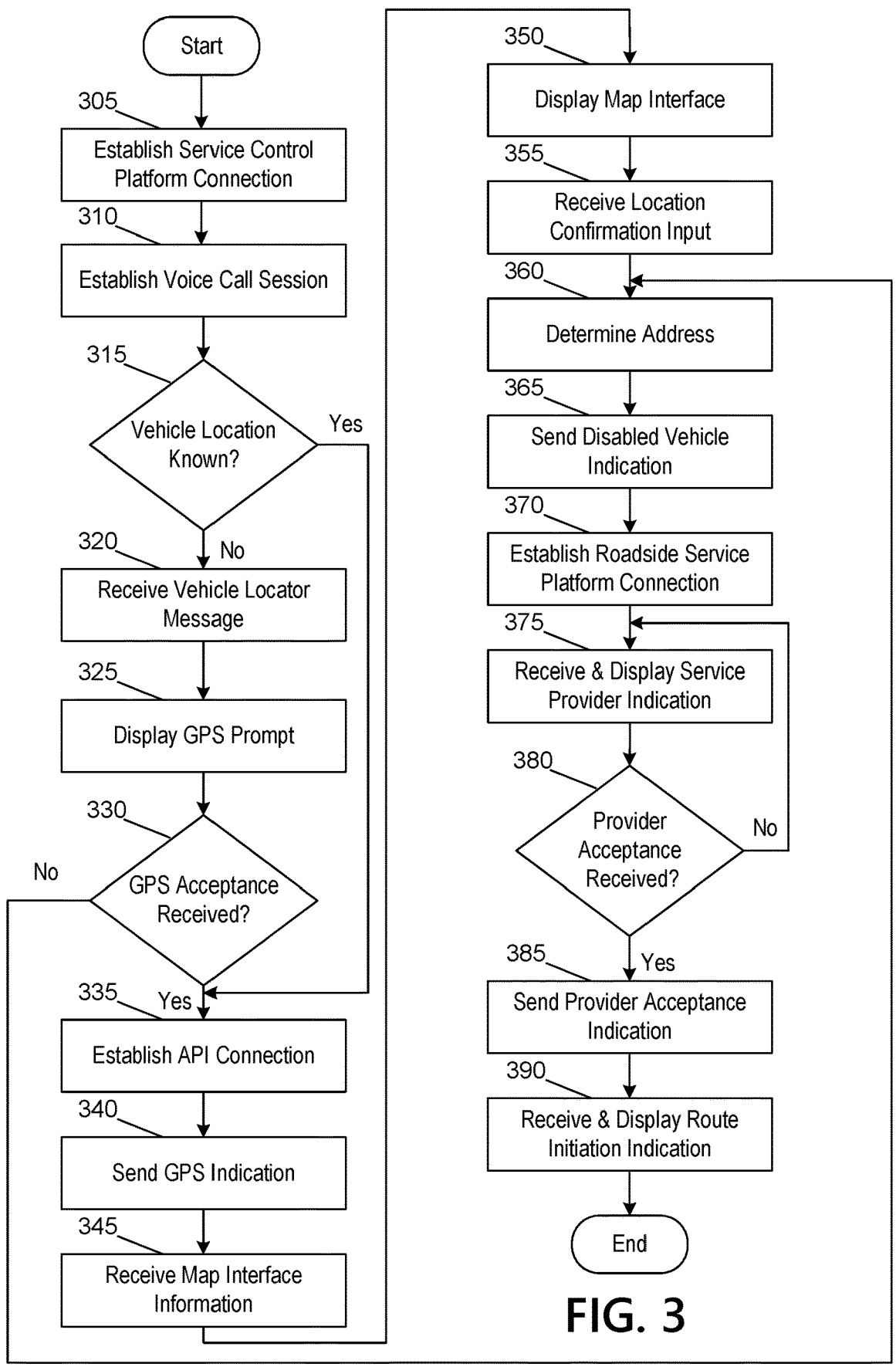
FIGS. 3-4 depict illustrative methods for a dynamic roadside service control platform that utilizes improved techniques for roadside service management and output generation in accordance with one or more example arrangements discussed herein.

FIG. 3 depicts an illustrative method for deploying a dynamic roadside service control platform that utilizes improved techniques to address roadside service requests in accordance with one or more example embodiments. To elaborate further, FIG. 3 depicts the event sequence illustrated by FIGS. 2A-2J from the perspective of the client device. Referring to FIG. 3, at step 305, a computing platform including at least one processor, a communication interface, and memory may establish a connection with a dynamic roadside service control platform. At step 310, the computing platform may establish a voice call session with the dynamic roadside service control platform. At step 315, the computing platform may determine whether a location of a disabled vehicle is known. If the location of the disabled vehicle is not known, the computing platform may proceed to step 320. If the location of the disabled vehicle is known, the computing platform may proceed to step 335.

At step 320, the computing platform may receive a vehicle locator message requesting access to GPS data corresponding to the computing platform. At step 325, the computing platform may display a prompt for an input to allow access to the GPS data. At step 330, the computing platform may determine whether access to the GPS data was granted. If access was not granted, the computing platform may proceed to step 360. If access was granted, the computing platform may proceed to step 335.

At step 335, the computing platform may establish a connection with an API host platform. At step 340, the computing platform may send an indication that access to the GPS data is granted to the API host platform. At step 345, the computing platform may receive map interface information from the API host platform based on the GPS data. At step 350, the computing platform may display a map interface based on the map interface information. At step 355, the computing platform may receive a location confirmation input indicating that a pin on the map interface corresponds to the location of the disabled vehicle. At step 360, the computing platform may determine the address of the disabled vehicle. At step 365, the computing platform may send an indication of the disabled vehicle including the address to the dynamic roadside service control platform. At step 370, the computing platform may establish a connection with a roadside service output platform. At step 375, the computing platform may receive and display a service provider indication. At step 380, the computing platform may determine whether an acceptance of the indicated service provider was received. If acceptance was not received, the computing platform may return to step 375 to receive an indication of a new service provider. If acceptance was received, the computing platform may proceed to step 385.

At step 385, the computing platform may send an indication of the service provider acceptance to the roadside service output platform. At step 390, the computing platform may receive and display an indication that an employee of the service provider is en route to the disabled vehicle.

Figure 4:
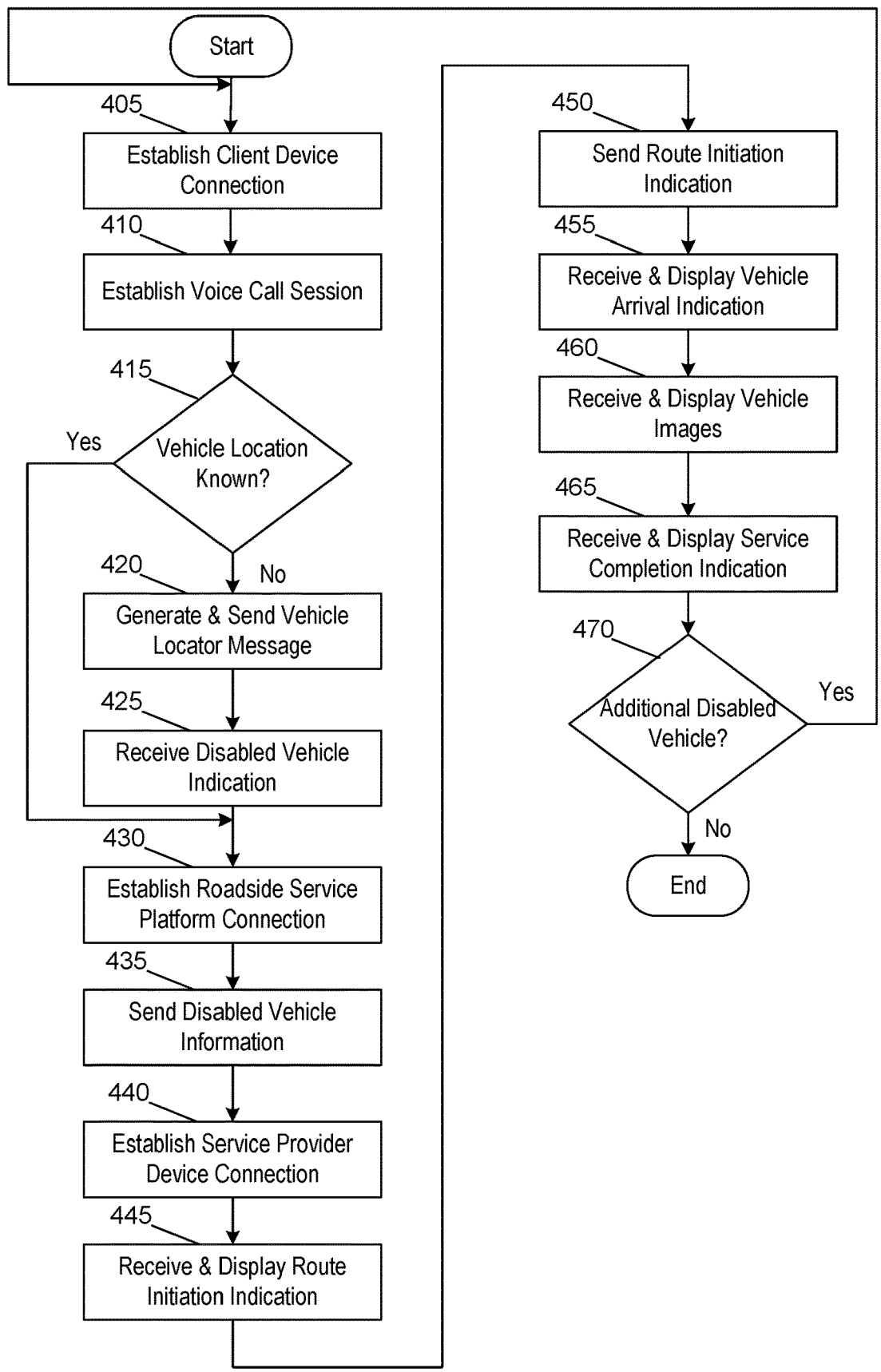

FIG. 4 depicts an illustrative method for deploying a dynamic roadside service control platform that utilizes improved techniques to address roadside service requests in accordance with one or more example embodiments. To elaborate further, FIG. 4 depicts the event sequence illustrated by FIGS. 2A-2J from the perspective of the dynamic roadside service control platform. Referring to FIG. 4, at step 405, a computing platform including at least one processor, a communication interface, and memory may establish a connection with a client device. At step 410, the computing platform may establish a voice call session with the client device. At step 415, the computing platform may determine whether a location of a disabled vehicle is already known. If the location of the vehicle is already known, the computing platform may proceed to step 430. If the location of the vehicle is not already known, the computing platform may proceed to step 420.

At step 420, the computing platform may generate and send a vehicle locator message to the client device. At step 425, the computing platform may receive a disabled vehicle indication indicating the location of the vehicle. At step 430, the computing platform may establish a connection with a roadside service output platform. At step 435, the computing platform may send information corresponding to the disabled vehicle to the roadside service output platform. At step 440, the computing platform may establish a connection with a service provider device. At step 445, the computing platform may receive an indication that an employee of the service provider is en route to the disabled vehicle from the service provider device and may display the indication. At step 450, the computing platform may forward the route initiation indication to the client device. At step 455, the computing platform may receive and display an indication that the employee of the service provider has arrived at the disabled vehicle. At step 460, the computing platform may receive and display vehicle images collected by the service provider device. At step 465, the computing platform may receive and display an indication that the employee has completed service with the disabled vehicle. At step 470, the computing platform may determine whether outstanding requests for additional disabled vehicles are pending. If so, the computing platform may return to step 405. If not, the method may end.

Figure 7:
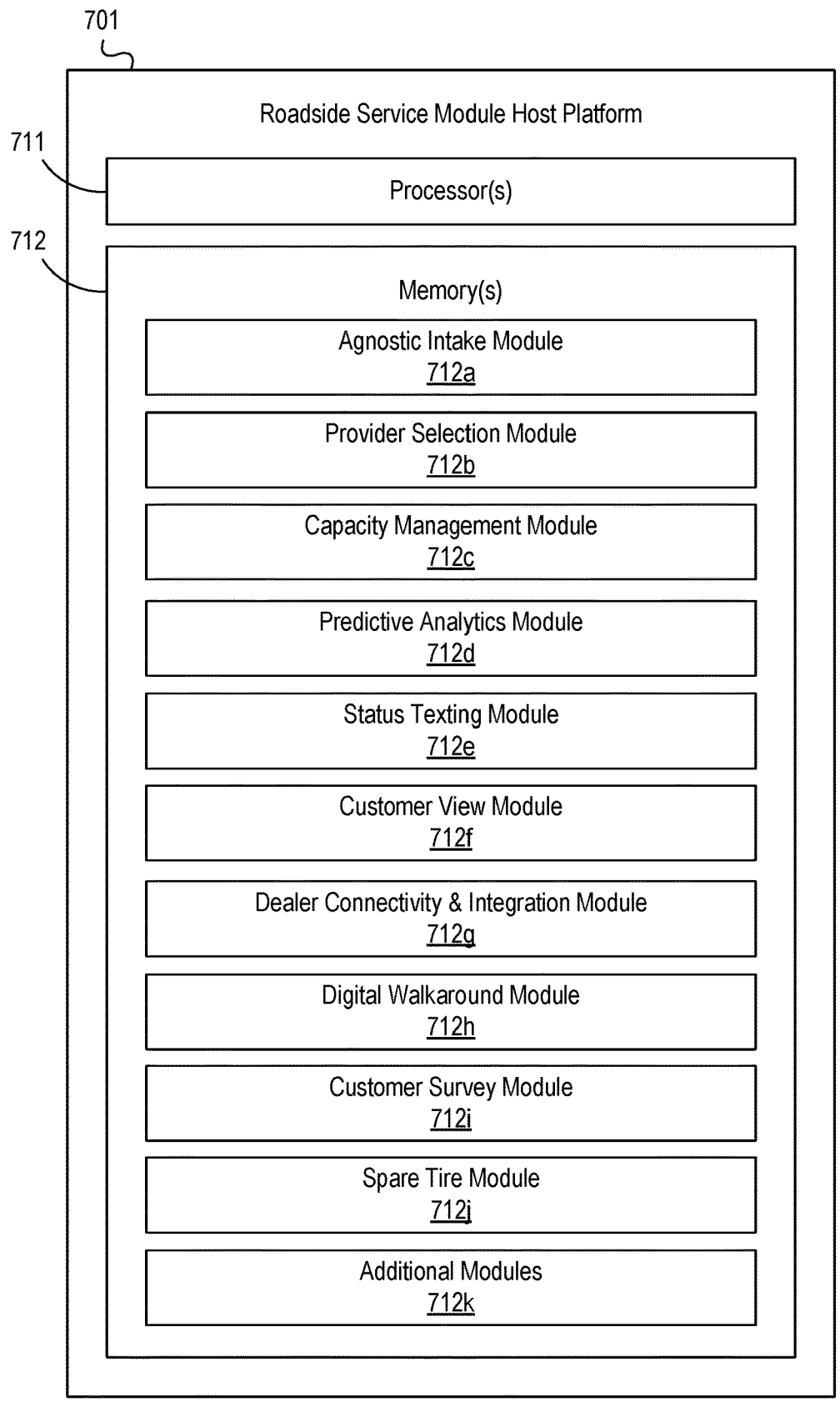

FIG. 7 depicts a roadside service module host platform that utilizes improved techniques for roadside service management and output generation in accordance with one or more example embodiments. Referring to FIG. 7, roadside service module host platform 701 may include one or more processors 711 and memory 712. A data bus may interconnect processor 711 and memory 712. Memory 712 may include one or more program modules having instructions that when executed by processor 711 cause roadside service module host platform 701 to perform one or more functions described herein and/or one or more databases that may store and/or otherwise maintain information which may be used by such program modules and/or processor 711. In some instances, the one or more program modules and/or databases may be stored by and/or maintained in different memory units of roadside service module host platform 701 and/or by different computing devices that may form and/or otherwise make up roadside service module host platform 701. For example, memory 712 may have, store, and/or include a plurality of modules for facilitating roadside service, as described below. It should be understood that roadside service module host platform 701 may correspond to a single computing device used to host the various modules. In other embodiments, the roadside service module host platform 701 may correspond to multiple computing devices used to host the various modules. In these instances, the roadside service module host platform 701 may include one or more of client device 102, dynamic roadside service control platform 103, roadside service output platform 104, service dispatch platform 105, API host platform 106, service provider device 107, or the like.

Agnostic intake module 712a may receive requests for rescue from customers, and may allow these requests for rescue to be directly processed by vehicle dealers, mechanics, call centers, or the like. Provider selection module 712b may implement one or more machine learning algorithms used to select service providers based on inputs such as proximity, cost, service type, availability, or the like to improve dispatch efficiency. Capacity management module 712c may manage resources involved in multiple rescues and may facilitate tracking of multiple rescues occurring for particular service providers, within a particular geographic region, or the like. In some instances, the capacity management module 712c may cause generation and display of an overall map interface that shows the locations of multiple disabled vehicles and service provider drivers engaged in the various rescues. Predictive analytics module 712d may profile rescues to predict success rates and/or quality of rescue. If the predictive analytics module 712d determines that a rate or quality of rescue is below a predetermined threshold, the predictive analytics module 712d may escalate the corresponding rescue request. Status texting module 712e may permit two-way texting between a customer device and an automated rescue response service. For example, the status texting module 712e may process a query from the customer device related to arrival of a service driver, and may generate/send a response accordingly. Customer view module 712f may allow vehicle dealers, mechanics, call centers, or the like to view live rescues (e.g., via an overall map) and may include indications of the qualities of the rescues. This may allow for yet another layer of quality control on service driver dispatch. Dealer connectivity and integration module 712g may facilitate dispatch of service drivers directly from a vehicle dealership, determine when a vehicle is en route to the dealership for service, receive advance notice of repairs to be performed, or the like. Digital walkaround module 712h may facilitate and process digital photos and video corresponding to a disabled vehicle (e.g., a 360 degree walk-around view of the disabled vehicle). In some instances, the digital walkaround module 712h may also store the corresponding digital photos and video along with geotagging information that correlates the photos/video to the location in which they were captured. In these instances, the roadside service module host platform 701 may determine, based on the geotagging information and the photos/video, a potential service provider that may assist with the disabled vehicle. For example, the roadside service module host platform 701 may determine the service provider based on one or more of proximity to the disabled vehicle, cost, service type, availability, or the like. In one or more instances, after determining the potential service provider, the roadside service module host platform 701 may generate and send an indication of the potential service provider to a device that provided the photos/video content (e.g., client device 102, or the like). In one or more instances, the indication of the potential service provider may prompt a user to accept the potential service provider. For example, the client device 102 may generate a user interface that displays a name of the potential service provider and prompts a user to select an "accept" or "do not accept" button. In one or more instances, in response to receiving an indication that the potential service provider is acceptable, the roadside service module host platform 701 may cause a driver of the potential service provider to be dispatched to the location of the disabled vehicle. In one or more instances, once the potential service provider is accepted, the roadside service module host platform 701 may generate and send an indication of a type of damage to the vehicle and an estimated time of arrival of the damaged vehicle at the service provider. This may allow the service provider to prepare for the damaged vehicle's arrival and to expedite service to the vehicle. Survey module 712i may administer, process, and store customer satisfaction surveys related to rescue requests. In some instances, survey module 712i may use this data to improve overall functionality of the roadside service module host platform 701.

Spare tire module 712j may maintain a network of spare tire providers, receive indications of flat tires, dispatch service drivers to one of the spare tire providers, administer deposits for the tires, and manage returns of the spare tires. For example, based on video content received (e.g., the video described above with regard to digital walkaround module 712h) and geolocation information corresponding to a disabled vehicle, the roadside service module host platform 701 may determine at least one spare tire provider (e.g., dealership, garage, auto part store, or the like), located within a predetermined distance of the disabled vehicle. After determining the at least one spare tire provider, the roadside service module host platform 701 may confirm that the at least one spare tire provider does in fact have an available inventory of spare tires. In one or more instances, the potential service provider determined (e.g., as described above with regard to the digital walkaround module 712h) may be dispatched to the at least one spare tire provider en route to the disabled vehicle to pick up a spare tire on their way to the disabled vehicle. In one or more instances, the spare tire module 712j may receive an indication that a spare tire installed by the potential service provider has been replaced by an inflated non-spare tire. For example, the service driver may perform a quick tire change to replace a blown tire with a temporary spare tire, and the owner of the vehicle may then drive the vehicle to another service facility to have the temporary spare tire replaced with a standard tire (e.g., they may go to their typical mechanic or dealership, or the like). Once the spare tire has been replaced, the spare tire module 712j may receive an indication that the spare tire has been replaced (e.g., from a computing platform corresponding to the repair facility), and the spare tire module 712j may determine a location of the now repaired vehicle. After determining a location of the repaired vehicle, the spare tire module 712j may determine a spare tire provider that is closest to the location of the repaired vehicle (e.g., a repository for spare tires). In some instances, this spare tire provider may be different than the spare tire provider that the driver initially picked the spare tire up from en route to the disabled vehicle. The spare tire module 712j may send an indication to the client device 102, instructing the user to return the spare tire to the determined spare tire provider. In one or more instances, the indication instructing the user to return the spare tire to the determined spare tire provider may include map interface data that is used to generate a map interface showing a route between the location of the repaired vehicle and the spare tire provider (e.g., provide directions). Accordingly, a network of spare tire providers may be created that improves the efficiency of spare tire repairs, pick ups, and deposits. In one or more instances, the spare tire module 712j may update, at a predetermined interval, a database of spare tire providers and their corresponding spare tire availability/inventory.

It should be understood that although a number of modules are described with regard to the roadside service module host platform 701, it should be understood that the roadside service module host platform 701 may also maintain additional modules 712k, and may add or remove modules at any time.

Roadside service requests may be received by the roadside service module host platform 701, routed to one or more appropriate modules, and processed accordingly. As a result, the roadside service module host platform 701 may provide a modular and flexible computing platform for managing vehicle rescue requests with robust interactivity features. This may increase provider selection efficiency, upgrade request intake capability, and allow for more effective case management.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor; and
a memory storing computer readable instructions that, when executed by the at least one processor, cause the computing platform to:
receive map interface information;
display, using the map interface information, a map interface, wherein the map interface includes a visual identifier that is centrally located on the map interface and corresponds to a location of the computing platform;
receive, via a display of the computing platform, a location adjustment input requesting that the map interface be adjusted to place the visual identifier at a point on the map interface corresponding to a location of a vehicle, wherein:
the location of the vehicle is different than the location of the computing platform,
based on receiving the location adjustment input, the visual identifier remains in a fixed position on the display corresponding to an exact center of the display, and
the map interface adjusts, based on the location adjustment input, to place the visual identifier at a point on the map interface that corresponds to the location of the vehicle;
receive, after receiving the location adjustment input, a location confirmation input; and
send, based at least in part on the location confirmation input, a disabled vehicle indication, wherein the disabled vehicle indication includes the location of the vehicle and wherein sending the disabled vehicle indication causes dispatch of a service vehicle to the location of the vehicle.

2. The computing platform of claim 1, wherein the location of the vehicle is different than the location of the computing platform.

3. The computing platform of claim 1, wherein the memory stores additional computer-readable instructions that, when executed by the at least one processor, cause the computing platform to:
receive a vehicle locator message and one or more commands directing the computing platform to display a global positioning system (GPS) tracking prompt, wherein the vehicle locator message was generated by a dynamic roadside service control platform in response to a rescue request received from another computing platform.

4. The computing platform of claim 1, wherein the memory stores additional computer-readable instructions that, when executed by the at least one processor, cause the computing platform to:
determine, using GPS data corresponding to the visual identifier after the location adjustment input is received, an address corresponding to the location of the vehicle.

5. The computing platform of claim 1, wherein the memory stores additional computer-readable instructions that, when executed by the at least one processor, cause the computing platform to:
receive an indication of a service provider to be dispatched to the location of the vehicle;
display the indication of the service provider; and
in response to receiving user input indicating that the service provider is acceptable, send an indication indicating that the service provider is acceptable.

6. The computing platform of claim 1, wherein the memory stores additional computer-readable instructions that, when executed by the at least one processor, cause the computing platform to:
receive an indication that a service provider has been dispatched to the location of the vehicle; and
display the indication that the service provider has been dispatched to the location of the vehicle.

7. The computing platform of claim 6, wherein displaying the indication that the service provider has been dispatched to the location of the vehicle comprises displaying a map interface that indicates progress of the service provider from a dispatch location to the location of the vehicle.

8. The computing platform of claim 6, wherein the service provider is determined based on the location of the vehicle.

9. A method comprising:
at a computing platform comprising at least one processor, a communication interface, and memory:
receiving map interface information;
displaying, using the map interface information, a map interface, wherein the map interface includes a visual identifier that is centrally located on the map interface and corresponds to a location of the computing platform;
receiving, via a display of the computing platform, a location adjustment input requesting that the map interface be adjusted to place the visual identifier at a point on the map interface corresponding to a location of a vehicle, wherein:
the location of the vehicle is different than the location of the computer platform,
based on receiving the location adjustment input, the visual identifier remains in a fixed position on the display corresponding to an exact center of the display, and
the map interface adjusts, based on the location adjustment input, to place the visual identifier at a point on the map interface that corresponds to the location of the vehicle;
receiving, after receiving the location adjustment input, a location confirmation input; and
sending, based at least in part on the location confirmation input, a disabled vehicle indication, wherein the disabled vehicle indication includes the location of the vehicle and wherein sending the disabled vehicle indication causes dispatch of a service vehicle to the location of the vehicle.

10. The method of claim 9, wherein the location of the vehicle is different than the location of the computing platform.

11. The method of claim 9, further comprising:
receiving a vehicle locator message and one or more commands directing the computing platform to display a global positioning system (GPS) tracking prompt, wherein the vehicle locator message was generated by a dynamic roadside service control platform in response to a rescue request received from another computing platform.

12. The method of claim 9, further comprising:
determining, using GPS data corresponding to the visual identifier after the location adjustment input is received, an address corresponding to the location of the vehicle.

13. The method of claim 9, further comprising:
receiving an indication of a service provider to be dispatched to the location of the vehicle;
displaying the indication of the service provider; and
in response to receiving user input indicating that the service provider is acceptable, sending an indication indicating that the service provider is acceptable.

14. The method of claim 9, further comprising:
receiving an indication that a service provider has been dispatched to the location of the vehicle; and
displaying the indication that the service provider has been dispatched to the location of the vehicle.

15. The method of claim 14, wherein displaying the indication that the service provider has been dispatched to the location of the vehicle comprises displaying a map interface that indicates progress of the service provider from a dispatch location to the location of the vehicle.

16. One or more non-transitory computer-readable media storing instructions that, when executed by a computing platform comprising at least one processor, a communication interface, and memory, cause the computing platform to:
receive map interface information;
display, using the map interface information, a map interface, wherein the map interface includes a visual identifier that is centrally located on the map interface and corresponds to a location of the computing platform;
receive, via a display of the computing platform, a location adjustment input requesting that the map interface be adjusted to place the visual identifier at a point on the map interface corresponding to a location of a vehicle wherein:
the location of the vehicle is different than the location of the computing platform,
based on receiving the location adjustment input, the visual identifier remains in a fixed position on the display corresponding to an exact center of the display, and
the map interface adjusts, based on the location adjustment input, to place the visual identifier at a point on the map interface that corresponds to the location of the vehicle;
receive, after receiving the location adjustment input, a location confirmation input; and
send, based at least in part on the location confirmation input, a disabled vehicle indication, wherein the disabled vehicle indication includes the location of the vehicle and wherein sending the disabled vehicle indication causes dispatch of a service vehicle to the location of the vehicle.

17. The one or more non-transitory computer-readable media of claim 16, wherein the location of the vehicle is different than the location of the computing platform.

18. The one or more non-transitory computer-readable media of claim 16, wherein the memory stores additional computer-readable instructions that, when executed by the at least one processor, further cause the computing platform to:
receive a vehicle locator message and one or more commands directing the computing platform to display a global positioning system (GPS) tracking prompt, wherein the vehicle locator message was generated by a dynamic roadside service control platform in response to a rescue request received from another computing platform.

19. The one or more non-transitory computer-readable media of claim 16, wherein the memory stores additional computer-readable instructions that, when executed by the at least one processor, further cause the computing platform to:
determine, using GPS data corresponding to the visual identifier after the location adjustment input is received, an address corresponding to the location of the vehicle.

20. The one or more non-transitory computer-readable media of claim 16, wherein the memory stores additional computer-readable instructions that, when executed by the at least one processor, further cause the computing platform to:
receive an indication of a service provider to be dispatched to the location of the vehicle;
display the indication of the service provider; and
in response to receiving user input indicating that the service provider is acceptable, send an indication indicating that the service provider is acceptable.

21. The one or more non-transitory computer-readable media of claim 16, wherein the memory stores additional computer-readable instructions that, when executed by the at least one processor, further cause the computing platform to:
- receive an indication that a service provider has been dispatched to the location of the vehicle; and
- display the indication that the service provider has been dispatched to the location of the vehicle.

\* \* \* \* \*